No. 779,007. PATENTED JAN. 3, 1905.
M. SMITH & J. G. WATERSTON.
CHAIN, CABLE, OR WIRE STRETCHER.
APPLICATION FILED MAY 19, 1904.
2 SHEETS—SHEET 2.
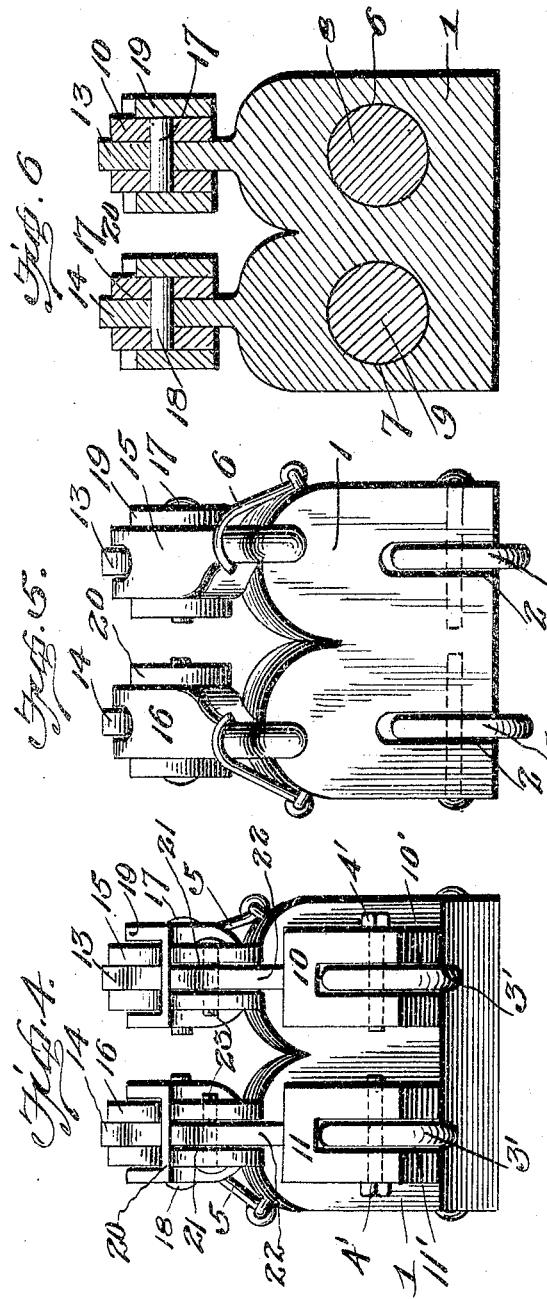
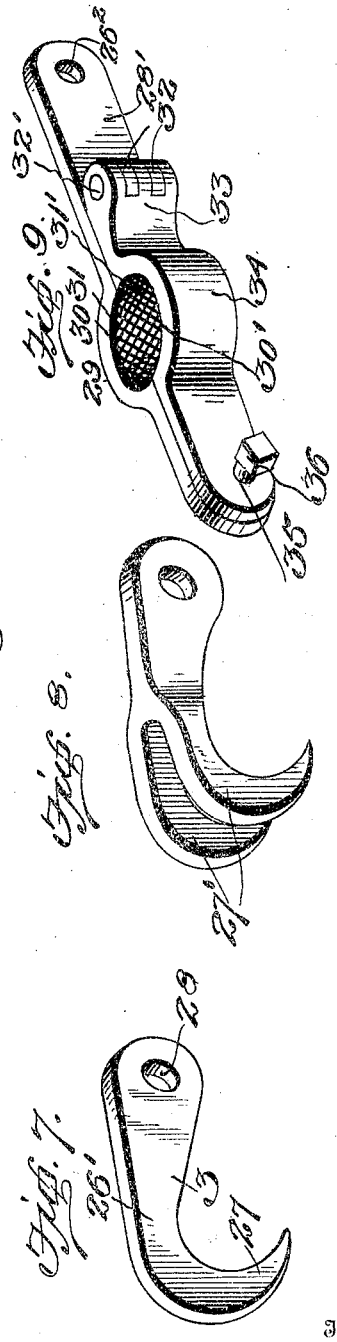
Witnesses
C. E. Hunt,
L. O. Hilton
Inventors
J. G. Waterston,
M. Smith
By H. B. Wilson
Attorney No. 779,007. Patented January 3, 1905.

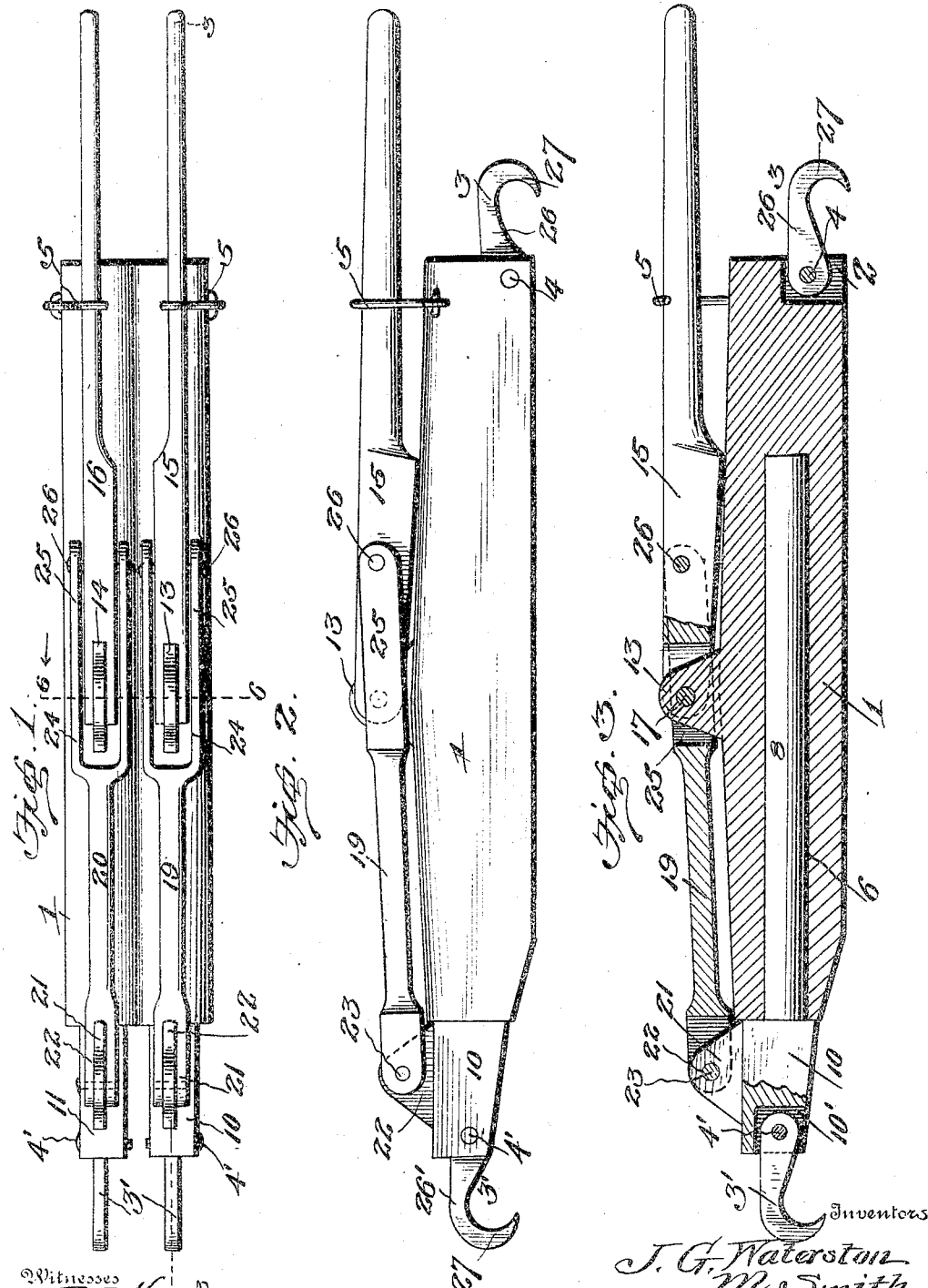

UNITED STATES PATENT OFFICE.

MATT SMITH AND JAMES G. WATERSTON, OF SCANLON, MINNESOTA, ASSIGNORS OF ONE-THIRD TO AMEDIA BOISSONNAUTH, OF SCANLON, MINNESOTA.

CHAIN, CABLE, OR WIRE STRETCHER.

SPECIFICATION forming part of Letters Patent No. 779,007, dated January 3, 1905.

Application filed May 19, 1904. Serial No. 208,775.

*To all whom it may concern:*

Be it known that we, MATT SMITH and JAMES G. WATERSTON, citizens of the United States, residing at Scanlon, in the county of Carlton and State of Minnesota, have invented certain new and useful Improvements in Chain, Cable, or Wire Stretchers; and we do declare the following to be a full, clear, and exact description of the invention, such as will enable others skilled in the art to which it appertains to make and use the same.

This invention relates to devices for stretching and tightening endless-chain conveyers, cables, fence and other wires, and the like.

The object of the invention is to provide a simple, inexpensive, and effective device of this character provided with interchangeable engaging or gripping members whereby the ends of conveyer belts and cables may be stretched taut and held while being connected and whereby also fence and other wires may be tightened and held while being connected together or secured to posts or other supports.

With these and other objects in view the invention consists of certain novel features of construction, combination, and arrangement of parts, as will be hereinafter more fully described, and particularly pointed out in the appended claims.

In the accompanying drawings, Figure 1 is a top plan view of a wire-stretcher embodying our invention. Fig. 2 is a side elevation of the same. Fig. 3 is a vertical longitudinal section on line 3 3 of Fig. 1. Figs. 4 and 5 are opposite end elevations. Fig. 6 is a cross-section on line 6 6 of Fig. 1, and Figs. 7, 8, and 9 are detail perspective views of the interchangeable engaging devices.

Referring now more particularly to the drawings, 1 represents the frame of the stretcher, which is provided at one end with slots 2 to receive the shanks of hooks or engaging devices 3, which are pivotally connected thereto by pivot pins, bolts, or screws 4, which pass through the walls of said slots and through the said shanks of the engaging devices. These engaging devices are designed to connect the frame with one end of the chain which is to be stretched and tightened. Adjacent to the said slots 2 the frame 1 is provided with pivoted suspension-hooks 5 for supporting it at that end from any suitable support.

In the frame 1 are formed parallel channels or guideways 6 and 7, receiving draft bars or rods 8 and 9, which fit and slide therein. The said guideways 6 and 7 open through the end of the frame opposite that at which the slots 2 are located, and the draft rods or bars 8 and 9 are provided at their outer ends with heads 10 and 11, which are adapted to abut against the frame and limit the inward movement of said bars or rods. The heads 10 and 11 are bifurcated or slotted at their outer ends, as indicated at 10' and 11', respectively, to receive the shanks of hooks or engaging devices 3', which are pivotally connected thereto by pivot pins, bolts, or screws 4' and which are similar in construction to the hooks 3. The hooks 3' are designed to connect the bars 8 and 9 with the opposite end of the chain to be stretched and tightened.

Formed or provided upon the upper side of the frame 1 are lugs 13 and 14, which fit within the lower bifurcated ends of adjusting or operating levers 15 and 16, which ends of the levers are pivoted thereto by pivot-pins, bolts, or similar connections 17 and 18, passing through registering apertures in the said lugs and bifurcated portions of the levers. The levers are in turn connected with the respective heads 10 and 11 of the draft rods or bars 8 and 9 by links or connecting-rods 19 and 20, each of which is bifurcated at its outer end, as shown at 21, to receive a lug 22 upon the head and pivotally connected to said lug by a pivot pin or bolt 23. The inner end of each link or connecting-rod is formed with an elongated slot 24, and the arms or side walls 25 thereof are connected at their inner ends by a pivot pin or bolt 26 to the coacting operating-lever above the pivotal connection of the same with the lug upon the frame 1. By this construction it will be seen that when either lever is swung upwardly and forwardly the draft rod or bar connected therewith will be moved outward from its guideway under the thrust imparted by the interconnecting link and that when the lever is moved inwardly or in the reverse direction to the end of its stroke the link will draw upon and slide the draft bar or rod inwardly and as the operating-lever continues its movement the inner pivoted end thereof will swing upward into the slot 24, allowing both the lever and link connected thereto to lie in the same plane, so that a self-locking action will be instituted by the swinging of the lever past center in one direction, whereby the end of the chain stretched and tightened upon said inward movement of the draft bar or rod will be held taut and the lever prevented from swinging forward under the pull thereof without the use of locking devices.

In the operation of the stretcher the frame 1 may be connected by its hooks 5 with any suitable stationary support, and the hooks 3 and 3' are engaged with the links at the opposite end of the chain to be stretched, and then the levers 15 and 16 are alternately operated to draw the ends of the chain toward each other and to take a fresh grip thereon, as will be readily understood. In this operation, assuming that the lever 15 has been used to draw upon the ends of the chain engaged by the connecting-hook 3' and has been turned down to its horizontal position to hold the said end of the chain against backward movement, it will be understood that the lever 16 is then moved forward to engage its hook 3' with the chain at a point beyond the hook of the lever 15 and then moved rearwardly in like manner to stretch the chain to a further extent, and this action is continued until the ends of the chain are brought into proper relation to be connected together.

The hooks 3 and 3' are of the form shown in detail in Fig. 7 and are alike in construction, each consisting of a bar or shank 26, having a single engaging hook 27 at one end thereof and provided at a suitable point in rear of the hook with a pin 28 for the passage of the pivot pin or member which connects it to the frame
1. This form of hook may be employed in the tightening of endless conveyer and other chains and objects to be tightened which have surfaces which may be engaged by the hooks. The hooks also adapt the devices for use in stretching fence and other wires, the connection being effected by looping the ends of the wires about the hooks or applying thereto looped grips, which may be engaged by the hooks. In some cases we may employ the form of engaging device shown in Fig. 8, which is similar in construction to the engaging devices previously described, except that it is provided with a pair of spaced hooks 27' in lieu of the single hook 27. This construction of engaging device (shown in Fig. 8) is peculiarly effective for use in stretching chains whose links are closely arranged, the double form of hook adapting the engaging device to straddle a link and engage the abutting ends of an adjoining or pivotal connection between the links.

In order to adapt the stretcher for tightening very large wires or cables, the construction of connection shown in Fig. 9 may be employed. This comprises a shank 28', having an opening 26² for pivotally connecting it to the frame 1 or head of the draft bars or rods, as before described in connection with the other engaging devices, and carrying a gripping-jaw 29, having a semicircular seat 30, the inner face 31 of which is serrated to tightly engage the surface of the wire or cable. The shank 28' is further provided with knuckles 32, pivotally connected by a pivot pin or bolt 32' to the knuckles 33 of a coöperating jaw 34, having a semicircular seat 30' to coact with said seat 30 of the jaw 29, such seat 30' being similarly serrated on its inner side, as indicated at 31'. The outer ends of the jaws are formed with apertures 35 for the passage of a bolt 36 to connect them together, so that a rope or cable engaged by the seat portions 30 and 30' will be tightly gripped between them. It will be seen that several engaging devices are made interchangeable for connection with the frame and draft bars or rods, so that one and the same machine may be employed by slight rearrangement of parts for tightening link and other chains, wires, and cables of various kinds.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described our invention, what we claim, and desire to secure by Leters Patent, is—

1. A stretcher comprising a frame having parallel guideways therein, a draft-bar mounted to slide independently in each of the guideways, a link connected to each draft-bar, two lugs on the frame, two operating-levers, one connected to each link and to each lug on the frame, and means for locking said levers to the frame, whereby the draft-bars may be independently and alternately operated to obtain a fresh grip by one draft-bar while the other draft-bar is stretching the chain or cable.

2. In a stretcher, the combination of a frame provided with guideways and pivot-lugs, draft bars or rods slidably mounted in said guideways and provided at their outer ends with pivot-lugs, operating-levers pivoted to the pivot-lugs of the frame, and links connecting the levers with the pivot-lugs of the draft bars or rods, said links being provided with slots to receive the pivoted ends of the levers, whereby the latter are adapted to fold parallel to said links to institute a self-locking action, substantially as described.

In testimony whereof we have hereunto set our hands in presence of two subscribing witnesses.

MATT SMITH.
JAMES G. WATERSTON.

Witnesses:
E. J. BAUMAN,
W. J. DAWSON.